UNITED STATES PATENT OFFICE.

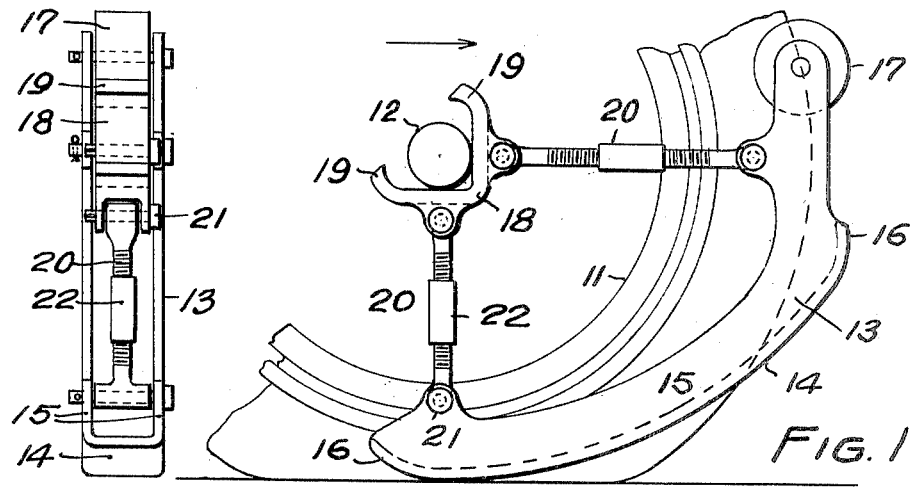
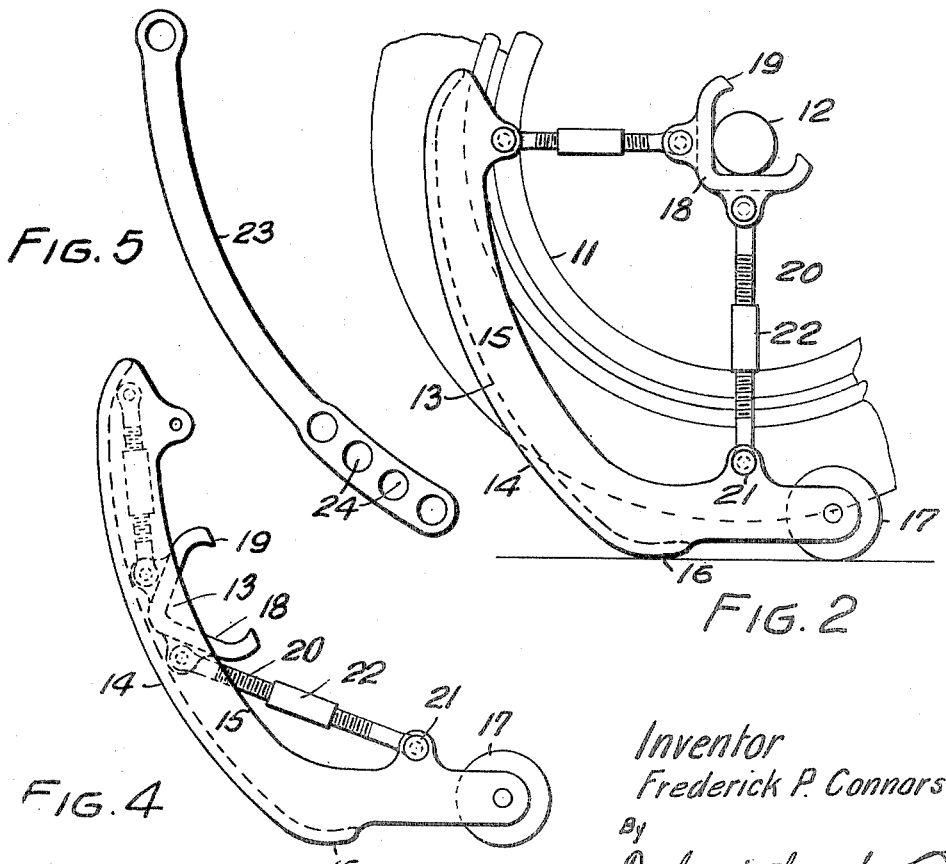

FREDERICK P. CONNORS, OF MONTREAL, QUEBEC, CANADA.

VEHICLE-JACK.

1,399,691.  Specification of Letters Patent.  Patented Dec. 6, 1921.

Application filed September 7, 1920. Serial No. 408,721.

*To all whom it may concern:*

Be it known that I, FREDERICK P. CONNORS, a citizen of the Dominion of Canada, and resident of the city of Montreal, in the Province of Quebec and Dominion of Canada, have invented certain new and useful Improvements in Vehicle-Jacks, of which the following is a full, clear, and exact description.

This invention relates to improvements in vehicle jacks, and the object of the invention is to provide a simple, and durable jack which may be operated by a vehicle itself without the application of manual force.

A further object is to provide a jack which when once adjusted for any given vehicle maintains this adjustment and does not require to be readjusted each time it is used, as is usually the case with vehicle jacks.

The device consists briefly of an arcuate member forming a lifting cam and provided with a center adjustable with respect to the arcuate member and adapted to support the axle of a vehicle.

In the drawings which illustrate the invention;

Figure 1 is an elevation of the device as adjusted preparatory to lifting a vehicle.

Fig. 2 is an elevation of the device illustrating a vehicle lifted thereby.

Fig. 3 is an edge elevation of the device, as seen in Fig. 1.

Fig. 4 is a plan view of the device folded for transport.

Fig. 5 is a plan view showing the alternative formation of a part of the jack.

Referring more particularly to the drawings, 11 designates a vehicle wheel and 12 the axle carrying same. In Fig. 1, the wheel is illustrated as being provided with a pneumatic tire, which is flattened under load as a result of low air pressure therein, while in Fig. 2 a similar tire is shown fully distended and clear of the ground.

The body of the jack is an arcuate member 13 preferably of channel or U-shape in cross section, as shown in Fig. 3, the curvature of the member being preferably circular and of a radius greater than the radius of the largest wheel for which the jack is adapted. The central or webbed portion 14 of the channel forms a tread of appreciable width, upon which the jack may roll and stand with security. The flanges 15 support the web in the desired curved formation and in addition form convenient means of attachment for the other parts of the device. At both ends, the tread may be curved inwardly from its normal arc as shown at 16. At one end of the member 13, the flanges 15 are continued beyond the tread and support between them a roller 17 of suitable size, which is located entirely within a prolongation of the arc of tread curvature. For convenience, the member 13, together with the roller 17, will be hereafter included in the term "cam."

A V-shaped member 18 is provided having its extremities 19 inwardly turned, the dimensions of the member being such that the axle of a vehicle will be readily received between the arms thereof and will be held against accidental displacement by the inturned ends 19. This member 18 or axle rest is connected by adjustable links 20 with the cam 13. Conveniently, these links may be connected to the rest 18 and between the flanges of the cam by removable pins 21. If desired the links 20 may be in the form of members threaded right and left hand and connected by turn-buckles 22.

The links may, however, equally well be solid bars 23 provided with a plurality of apertures 24 to enable adjustment relatively to the cam, as shown in Fig. 5. It will also be noted in Fig. 5 that the link 23 is curved, whereas the links 20 of the other figures are straight. This curvature will enable the link to fold more compactly within the cam, as will be hereinafter described.

The operation of the device is extremely simple. The effective length of the links is adjusted in accordance with the vehicle on which the jack is to be used, one link being made shorter than the other as clearly shown. The long link connects the rest 18 and the roller bearing end of the cam and the length of the link is such that, when the weight of the vehicle is supported on this link, the wheel thereof will be clear of the ground, as clearly shown in Fig. 2. The length of the shorter link connecting to the opposite end of the cam is such that when a wheel is resting on the ground, the jack may be readily inserted between the axle and the ground, as shown in Fig. 1. This adjustment having been once established, it will not be necessary to alter the same unless the jack is used for a vehicle having wheels of another size.

When it is desired to raise a vehicle, the rest 18 is inserted under the axle with the short link down and the cam rotated by hand about the axle until it wedges between the axle and the ground. The roller bearing end of the cam will thus be elevated, as shown in Fig. 1. The vehicle is now moved forward by its usual means of locomotion, with the result that the weight formerly on the wheel is transferred gradually to the cam which, as it rolls on the ground, raises the wheel. This movement continues until the end of the tread adjacent the roller is reached, whereupon the roller engages the ground and with the inturned end of the thread forms a two-point support. As clearly shown in Fig. 2, the two points of support are located on opposite sides of a vertical dropped from the axle, so that the jack will stand securely without tendency to continue rotation in the original direction or to rotate in a reverse direction. If the force moving the vehicle in the direction of the arrow, Fig. 1, should be too great or should be applied for too long a time, the roller 17 will run along the ground and prevent the jack continuing its movement, so as to pass entirely under the axle. Owing to the difference in the length of the links 20 and the consequent eccentric arrangement of the rest 18 relatively to the cam tread, the wheel will be raised clear of the ground, as shown in Fig. 2, and may be dealt with as desired. When it is desired to remove the jack, the vehicle is moved by its own motive power in the opposite direction to that shown by the arrow, Fig. 1, so that the jack will be restored to its original position and can be readily removed.

When the jack is not in use, it may be folded to compact form for storage by removing any one of the pins 21, but preferably the pin connecting the short link and cam. The links and axle rest 18 may now be folded between the flanges of the cam, as illustrated in Fig. 4. When using curved links, such as illustrated in Fig. 5, the device will fold even more compactly than when straight links are used, as the curved links will follow approximately the curvature of the cam. While the device has been illustrated as detachable from the vehicle when not in use, it will be understood that the rest 18 may be attached to the axle by any suitable means and the jack suspended below the body of the vehicle and clear of the ground, being thus in position for immediate use and at the same time avoiding the loss of storage space in the vehicle incident to carrying the jack. When such a relation of the jack and vehicle is established, it will obviously be unnecessary to provide adjustment between the rest and came or to provide for folding up the jack, so that the whole device may if desired be of rigid construction.

It will be understood that a large number of modifications may be made in the construction and arrangement of details without departing from the spirit of the invention and that such modifications, which obviously cannot be contemplated in advance and which are within the scope of the invention, are included in the following claims:

Having thus described my invention, what I claim is,—

1. A jack comprising an axle rest, an arcuate cam member eccentrically disposed with respect to the axle rest, said cam member having a pair of spaced supporting points at the end remote from the rest adapted, in the axle supporting position of the device, to be disposed on opposite sides of a vertical dropped from the axle.

2. A device according to claim 1, in which one of the supports is a roller.

3. In combination with a device according to claim 1, adjustable links connecting the axle rest and cam.

4. A jack comprising an axle rest, an arcuate cam member eccentrically disposed with respect to the axle rest, said cam member having a pair of spaced supporting points at the end remote from the rest, and members connecting the axle rest and cam, one of said members meeting the cam substantially midway between the spaced points of support thereof.

5. A device according to claim 1, in which the cam is channel or U-shaped in cross-section.

6. A device according to claim 1, in which the axle rest is a V-shaped member having inturned extremities adapted to hold an axle against accidental escape.

7. A jack comprising an axle rest, an arcuate cam member eccentrically disposed with respect to the rest and being of channel cross section, links pivotally connected to the rest and between the flanges of the channel-shaped cam, said links and rest being foldable between the flanges of the cam upon separation at any one of the pivotal points of the links.

8. A jack comprising an axle rest and an arcuate cam member carrying a roller at one end thereof.

9. A jack comprising an axle rest and an arcuate cam member carrying a roller at one end thereof and provided adjacent said roller with a supporting point adapted in the axle supporting position of the device to coöperate with the roller in providing a stable support.

10. A jack comprising an axle rest, an arcuate shaped ground engaging member, connecting between said axle rest and the ends of the ground engaging member, a roller carried by one end of the member, and a supporting point formed on the member in proximity to said roller.

11. A jack comprising a V-shaped axle rest, an arcuate ground engaging member, and a connecting member extending between each arm of the V-shaped rest and the arcuate ground engaging member, said connecting member being secured to the arm at a point intermediate the length of the latter.

12. A jack comprising a V-shaped axle rest, an arcuate ground engaging member, and links of unequal length extending between said member and the arms of the rest.

13. An arrangement according to the preceding claim 12 in which the links are adjustable to vary the distance between the axle rest and the cam member.

In witness whereof I have hereunto set my hand.

FREDERICK P. CONNORS.